United States Patent
Hasty, Jr. et al.

(10) Patent No.: US 6,728,232 B2
(45) Date of Patent: Apr. 27, 2004

(54) SYSTEM AND METHOD FOR AUTO-CONFIGURATION AND DISCOVERY OF IP TO MAC ADDRESS MAPPING AND GATEWAY PRESENCE IN WIRELESS PEER-TO-PEER AD-HOC ROUTING NETWORKS

(75) Inventors: William V. Hasty, Jr., Longwood, FL (US); Charles E. Baenen, Merritt Island, FL (US); Shawn P. Welsh, Maitland, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/386,928

(22) Filed: Mar. 13, 2003

(65) Prior Publication Data

US 2003/0179750 A1 Sep. 25, 2003

Related U.S. Application Data (60) Provisional application No. 60/364,021, filed on Mar. 15, 2002.

(51) Int. Cl.[7] .................................................. H04Q 7/24
(52) U.S. Cl. ......................... 370/338; 370/401; 370/475
(58) Field of Search ................................. 370/351–356, 370/338, 349, 350, 400, 401, 475, 471, 389; 709/220, 221, 222, 245

(56) References Cited

U.S. PATENT DOCUMENTS

| 4,494,192 A | 1/1985 | Lew et al. ............... 364/200 |
| 4,617,656 A | 10/1986 | Kobayashi et al. .......... 370/74 |
| 4,736,371 A | 4/1988 | Tejima et al. ............... 370/95 |

(List continued on next page.)

FOREIGN PATENT DOCUMENTS

| CA | 2132180 | 3/1996 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Sutanto US 2003/0039240 A1, Methods, Systems and Computer Program Products for Accessing an Embedded Web Server on a Broadband Access Terminal, Feb. 27, 2003.*

Doyle et al. US 2003/0043853, Methods, Systems and Computer Program Products for Detecting a Spoofed Source Address in IP Datagrams.*

(List continued on next page.)

Primary Examiner—Frank Duong
Assistant Examiner—Melanie Jagannathan
(74) Attorney, Agent, or Firm—Gardner Carton & Douglas LLP; Joseph J. Buczynski (57) ABSTRACT

An system and method for handling broadcast network requests for auto-configuration and discovery of IP to MAC address mappings and gateway presence in wireless peer-to-peer ad-hoc routing networks. The significant portion of a node's IP address is calculated by applying a hashing function to the six-byte hardware (MAC) address. The significant portion is appended to routing advertisements, and thereby propagates passively to other network nodes. DHCP and ARP requests, as well as other broadcast type requests, are handled by the local network stack of a node, without requiring a broadcast transmission over the wireless channel.

31 Claims, 7 Drawing Sheets

U.S. PATENT DOCUMENTS

| | | | |
|---|---|---|---|
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,708,654 A * | 1/1998 | Arndt et al. | 370/242 |
| 5,717,689 A | 2/1998 | Ayanoglu | 370/349 |
| 5,724,510 A | 3/1998 | Arndt et al. | 395/200 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,195,356 B1 * | 2/2001 | Anello et al. | 370/398 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,292,838 B1 * | 9/2001 | Nelson | 709/236 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,466,986 B1 * | 10/2002 | Sawyer et al. | 709/245 |
| 2001/0053699 A1 | 12/2001 | McCrady et al. | 455/513 |
| 2003/0039240 A1 | 2/2003 | Sutanto | 370/352 |
| 2003/0043853 A1 | 3/2003 | Doyle et al. | 370/489 |

OTHER PUBLICATIONS

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self–Organizing, Self–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactical Multi–Channel Software Radios".

\* cited by examiner

SYSTEM AND METHOD FOR AUTO-CONFIGURATION AND DISCOVERY OF IP TO MAC ADDRESS MAPPING AND GATEWAY PRESENCE IN WIRELESS PEER-TO-PEER AD-HOC ROUTING NETWORKS

This application claims benefit under 35 U.S.C. §119(e) from U.S. provisional patent application Ser. No. 60/364,021 entitled "A System And Method For Auto-Configuration And Discovery Of IP To MAC Address Mapping And Gateway Presence In Wireless Peer-To-Peer Ad-Hoc Routing Networks", filed on Mar. 15, 2002, the entire contents of which is incorporated herein by reference.

BACKGROUND OF THE INVENTION

1. Field of the Invention

The present invention is related to a system and method for handling broadcast-type service requests in a peer-to-peer ad-hoc wireless network. More particularly, the present invention is related to an improved system and method for handling Address Resolution Protocol (ARP) and Dynamic Host Configuration Protocol (DHCP) messages, among other broadcast-type messages, within the network stack of a local node in order to provide auto-configuration and discovery of Internet Protocol (IP) to Media Access Control (MAC) address mapping services in a peer-to-peer ad-hoc wireless network.

2. Description of the Related Art

In recent years, a type of mobile communications network known as an "ad-hoc" network has been developed. In this type of network, each user terminal (hereinafter "mobile node") is capable of operating as a base station or router for the remaining mobile nodes, thus eliminating the need for a fixed infrastructure of base stations. Accordingly, data packets being sent from a source node to a destination node are typically routed through a number of intermediate mobile nodes before reaching the destination node. Details of such ad-hoc networks are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks, such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each of said patent applications being incorporated herein by reference.

Generally, all nodes present in a wireless ad-hoc peer-to-peer network provide similar services and functionality. These networks therefore distinguish themselves from infrastructure networks where one or more nodes offer a superset of the functionality of the remaining network. These infrastructure nodes in such networks typically can handle Dynamic Host Configuration Protocol (DHCP), Address Resolution Protocol (ARP), as well as other services that depend on broadcast traffic. Protocols, such as DHCP, are defined by IETF RFC 2131 and 2132, and are used by a client node to automatically obtain network settings from a central server. These network settings include the client's IP address, the address of Domain Name Servers (DNS), the IP address of default gateways, and numerous other network settings. Additional protocols, such as ARP, are defined by STD 0037 and RFC 0826, and are used by a network node to map IP addresses to MAC addresses so IP traffic can be delivered to specific hardware.

These infrastructure nodes are normally discovered by broadcast traffic advertisements from their client nodes in a network. However, as known to those skilled in the art, peer-to-peer networks typically do not contain specialized infrastructure nodes. In response to the advanced network configurations, the IEEE 802.11 standard offers a peer-to-peer mode in addition to an infrastructure mode. Details of the 802.11 standards are set forth in ISO/IEC 8802-11, ANSI/IEEE 802.11 "Information Technology—Telecommunications and Information Exchange Between Systems—Local and Metropolitan Area Network Specific Requirements", Part 11: Wireless Medium Access Control (MAC) and Physical Layer (PHY) Specifications, the entire contents of which being incorporated herein by reference. Also, a description of the 802.11 standard is presented in a text by Bob O'Hara and Al Petrick entitled "IEEE 802.11 Handbook: A Designer's Companion, IEEE", 1999, the entire contents of which being incorporated herein by reference.

There are difficulties to broadcast traffic capabilities encountered in either network. For example, wireless ad-hoc routing networks typically avoid repeating broadcast traffic in an effort to avoid "broadcast storms" that can flood the transmission medium with traffic and cripple the ability of the network to deliver traffic. Broadcast traffic reception is usually limited to nodes in the immediate listening area of the transmitting node. Since ARP and DHCP depend on broadcast traffic, ad-hoc routing networks sometimes "tunnel" this broadcast traffic in directed packets to known infrastructure nodes where it can be handled. Traditional non-ad-hoc networks do not encounter the broadcast problem because their nodes communicate directly with each other. As noted, however, wireless peer-to-peer ad-hoc routing networks do not contain infrastructure nodes and therefore do not have the option to tunnel their broadcast traffic. Protocol communications, such as DHCP, ARP, and other broadcast network protocols must be handled in another way.

Accordingly, a need exists for an improved system and method for handling DHCP and ARP requests, as well as other types of requests which require broadcast traffic, in a peer-to-peer ad-hoc wireless network. A further need exists for handling broadcast-type requests in a network not having infrastructure nodes having a superset of functionality without generating unnecessary broadcast traffic.

SUMMARY OF THE INVENTION

An object of the present invention is to provide a system and method to determine a Media Access Control address for a node, and apply a hashing function to reduce the address to a two byte appendix to a subnet Internet Protocol address.

Another object of the present invention is to provide a system and method to communicate as a routing advertisement, an address for a node containing both Media Access Control address information and sufficient Internet Protocol address information to enable address mapping of the nodes.

Still another object of the present invention is to provide a system and method to maintain routing advertisements in a local ad-hoc routing table, and apply the address mapping information stored therein to answer locally generated requests, including ARP and DHCP requests.

These and other objects are substantially achieved by providing ad-hoc routing networks with the ability to auto-configure and discover Internet Protocol address to Media Access Control mappings, and gateway presence, in wireless peer-to-peer ad-hoc networks. More particularly, the present invention provides a system and method for handling ARP and DHCP messages, among other broadcast-type messages, within the network stack of a local node in order to provide auto-configuration and discovery of IP to MAC address mapping services in a peer-to-peer ad-hoc wireless network.

The system and method determines a Media Access Control address for nodes of a network, which is identified by a subnet Internet Protocol address, and applies a hashing function to produce an abbreviated Media Access Control address. An Internet Protocol address is constructed based on the abbreviated Media Access Control address and the subnet Internet Protocol address, and is communicated as a routing advertisement.

Receiving nodes maintain a local ad-hoc routing table based on the routing advertisement and apply maintained data to locally. The maintained data is used to answer intercepted ARP and DHCP requests at the node which no longer require transmission, thereby reducing overhead transmission levels in the network.

BRIEF DESCRIPTION OF THE DRAWINGS

These and other objects, advantages and novel features of the invention will be more readily appreciated from the following detailed description when read in conjunction with the accompanying drawings, in which.

In the figures, it will be understood that like numerals refer to like features and structures.

DETAILED DESCRIPTION OF THE PREFERRED EMBODIMENTS

Figure 1:
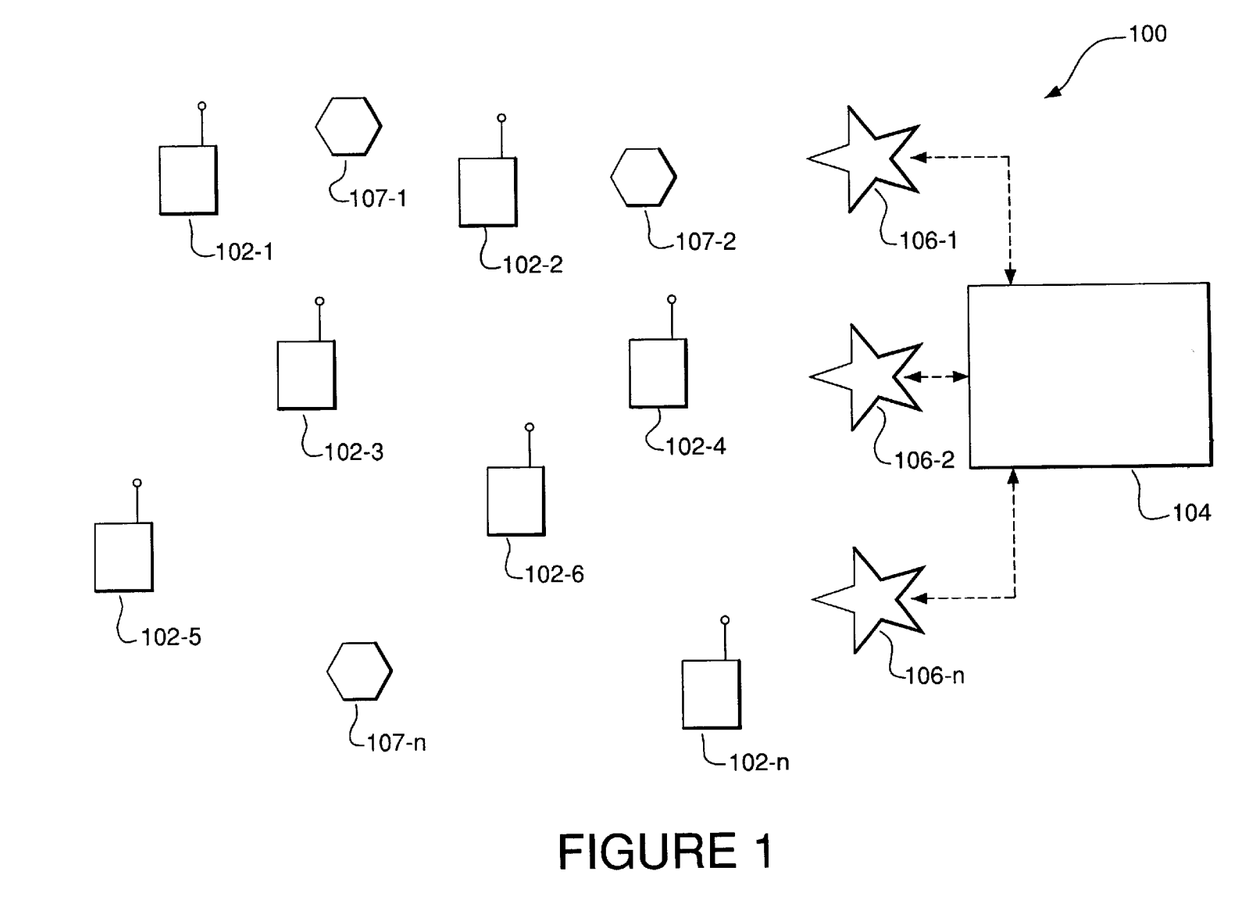
FIG. 1 is a block diagram of an example of an ad-hoc wireless communications network employing a system and method for auto-configuration and discovery of IP to MAC address mapping and gateway presence according to an embodiment of the present invention.

An embodiment of the invention will now be described with reference to the attached figures. FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to provide the nodes 102 with access to other networks, such as other ad-hoc networks, the public switched telephone network (PSTN) and the Internet. The network 100 further includes a plurality of fixed routers 107-1 through 107-n (referred to generally as nodes or routers 107) for routing data packets between other nodes 102, 106 or 107.

Figure 2:
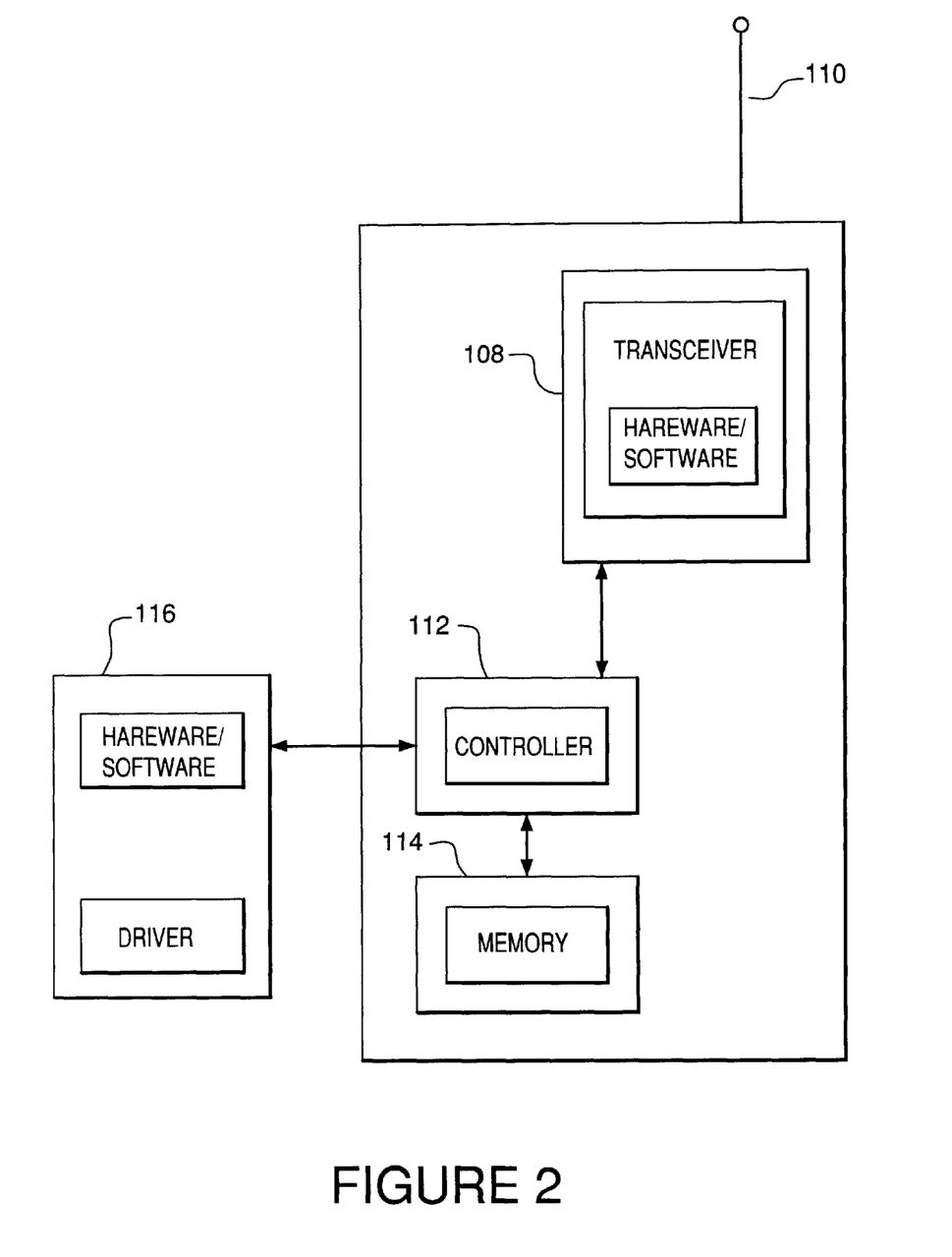
FIG. 2 is a block diagram illustrating an example of a mobile node employed in the network shown in FIG. 1.

As can be appreciated by one skilled in the art, the nodes 102, 106 and 107 are capable of communicating with each other directly, or via one or more other nodes 102, 106 or 107 operating as routers for data packets being sent between nodes, as described in U.S. Pat. No. 5,943,322 to Mayor and in U.S. patent application Ser. Nos. 09/897,790, 09/815,157 and 09/815,164, referenced above. Specifically, as shown in FIG. 2, each node 102, 106 and 107 includes a transceiver 108 which is coupled to an antenna 110 and is capable of receiving and transmitting signals, such as packetized data, to and from the node under the control of a controller 112. The packetized data signals can include, for example, voice, data or multimedia information, and packetized control signals, including node routing and update information.

Each node 102, 106 and 107 further includes a memory 114, such as a random access memory (RAM), that is capable of storing, among other things, routing information pertaining to itself and other nodes in the network 100. The nodes periodically exchange respective routing information, referred to as routing advertisements or routing table information, via a broadcasting mechanism at various intervals, such as when a new node enters the network or when existing nodes in the network move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform Transmission Control Protocol (TCP) and User Datagram Protocol (UDP) may also be included.

In addition to voice, data or multimedia information communications, a node 102, 106 or 107 will periodically broadcast routing table updates for use in various communication operations. Nodes in nearby positions will only receive the broadcast routing table updates if within broadcast range (e.g., radio frequency (RF) range) of the broadcasting node. For example, assuming that nodes 102-2, 102-3 and 102-5 in FIG. 1 are within the RF broadcast range of node 102-1, when node 102-1 broadcasts routing table information, the information is received by nodes 102-2, 102-3 and 102-5. However, nodes beyond the broadcast range of node 102-1, such as nodes 102-4 and 102-6, will not receive the broadcast routing table information.

Repeated broadcasts can be used to reach additional nodes moving within broadcast range. However, as noted above, wireless ad-hoc routing networks such as network 100 in FIG. 1 typically avoid repeating broadcast traffic in an effort to avoid "broadcast storms" that can flood the transmission medium with traffic and cripple the ability of the network to deliver traffic. As further noted earlier, wireless peer-to-peer ad-hoc routing networks can not implement "tunneling" as a solution to broadcast traffic, as such networks do not contain infrastructure nodes. Therefore DHCP, ARP, and other broadcast network protocols must be handled in another way.

An embodiment of the present invention described below provides a technique to automatically handle broadcast network configuration traffic without the need to tunnel the traffic to infrastructure nodes. While the embodiment of the invention is intended for wireless devices implementing the 802.11 ad-hoc mode, it is directly applicable to any peer-to-peer wireless modality. The ad-hoc routing peer-to-peer network for the embodiment of the present invention discussed herein is typically restricted to a class B subnet wherein only two bytes of the IP address are unique to each node. However, alternate embodiments are not limited to this restriction, and can be employed in networks where any number of bytes or portions of the IP address can be unique to each node.

Figure 3:
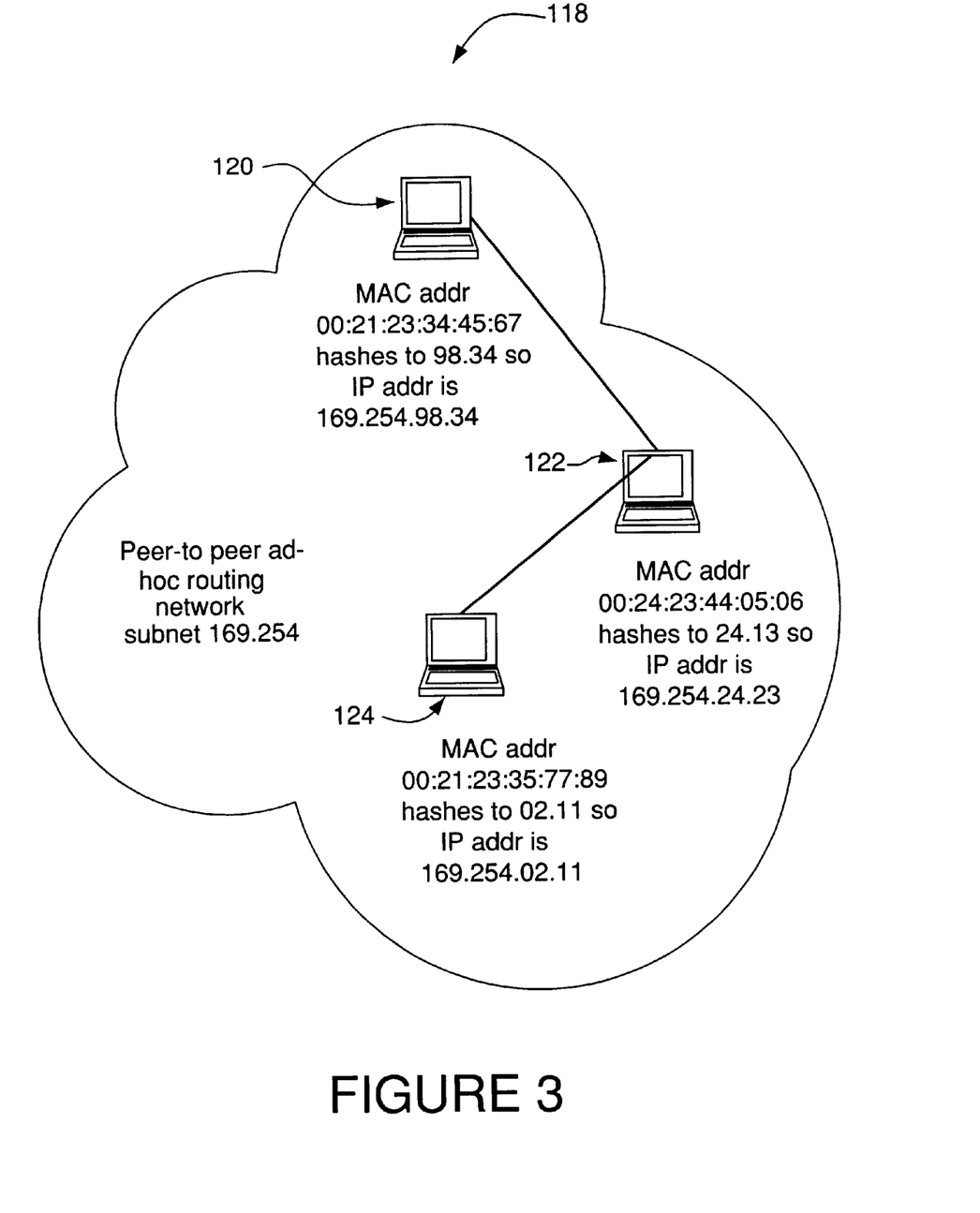
FIG. 3 illustrates an example IP to MAC address translation in a peer-to-peer ad-hoc network as shown in FIG. 1 in accordance with an embodiment of the present invention.

As illustrated in FIG. 3, the two bytes of the IP address unique to each node are determined at each node, respectively, when the node is energized. FIG. 3 illustrates an example IP to MAC address translation in a peer-to-peer ad-hoc network as shown in FIG. 1. In the example of FIG. 3, three nodes of FIG. 1 are shown in a class B subnet 118 having an address of (169.254). However, any number of nodes may be included. As known to those skilled in the art, each node of FIG. 3 includes a six byte MAC address of the node in this example. The determination of the two bytes of the IP address unique to each node is achieved in FIG. 3 by using an unspecified hashing function at each node to transform the six byte MAC address into the two low bytes of a class B IP address. The function is deterministic and is executed at each node. The resulting two byte address is appended to the high two bytes of the class B address to determine the IP address of the node. For example, node 120 of FIG. 3 has a MAC address of,

00:21:23:34:45:67

As known to those skilled in the art, MAC addresses are 12-digit hexadecimal numbers and are usually written in the following format:

MM:MM:MM:SS:SS:SS

The first half of a MAC address contains an ID number regulated by an Internet standards body. The second half of a MAC address represents the serial number assigned by the manufacturer. MAC addresses function at the data link layer (layer 2 in the OSI model) and allow nodes to identify themselves on a network at a relatively low level.

In the example of FIG. 3, node 120 of FIG. 3 has a MAC address of,

00:21:23:34:45:67

IP addresses consist of four bytes (32 bits) that uniquely identify all computers on the public Internet. MAC addresses are six bytes (48 bits) that manufacturers burn into their products to uniquely identify them. MAC addressing works at the data link layer, whereas IP addressing functions at the network layer (layer 3). The MAC address generally remains fixed and follows the network node, but the IP address changes as the network node moves from one network to another. In FIG. 3, the MAC address of node 120 is subjected to a hashing function, which results in a two byte address of, 98.34

This two byte address is appended to the two bytes of the class B address to determine a node 120 IP address of, 169.254.98.34

As known to those skilled in the art, IP addresses are composed of four hexadecimal couplets, which are usually converted to decimal form. The digits of the decimal form are separated by periods, creating an address such as "128.192.255.1". There are three methods of utilizing these addresses, which are identified as Class A, Class B, and Class C addressing schemes. The first two parts in a Class B address designate the type and location of a node, while the third digit can be used to further subdivide a network. The final digit in Class B network addresses is used to designate a specific node within a specific subnet of the network.

In an embodiment of the present invention, each node 102, 106 and 107 of the ad-hoc routing network 100 periodically advertises via one or more routing advertisements (RA), each MAC address of destination nodes to which it can forward traffic, as well as the path through the network used to reach each destination. The embodiment of the present invention adds the two bytes of the unique IP address of the node to the routing advertisements so each contains both the MAC address and a sufficient IP address to successfully perform a mapping between the two. This information is propagated throughout the network and retained in the routing tables, or ARP tables, of each network node. For example, a routing advertisement in FIG. 3 would include an address for node 120 of, 169.254.98.34

In one embodiment of the present invention, the two non-unique leading bytes of the IP address are implied. In another embodiment, they are advertised at network startup. This information may also be propagated throughout the network and retained in the routing tables of each network node.

Figure 4:
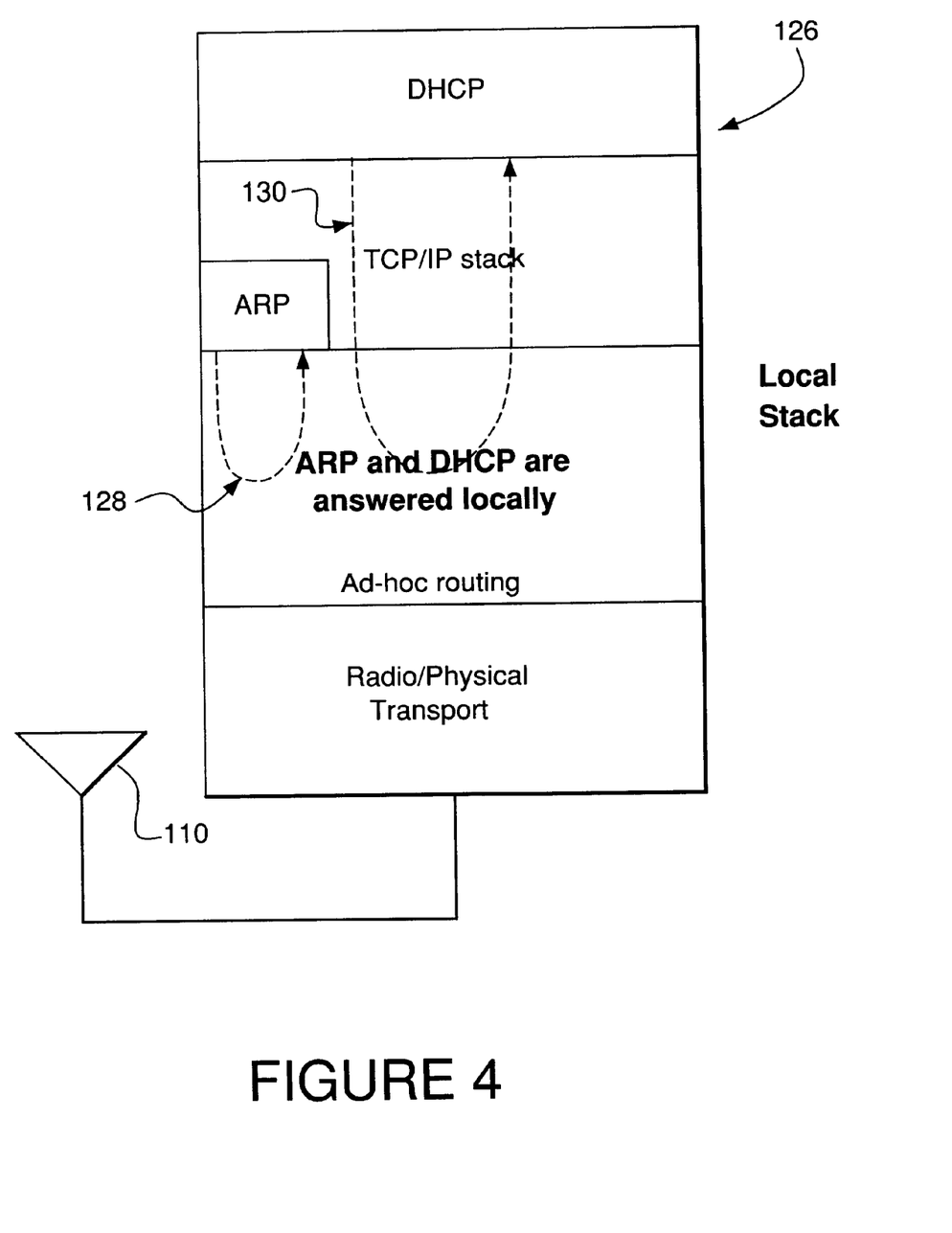
FIG. 4 illustrates an example of a local network stack handling broadcast requests internally in accordance with an embodiment of the present invention.

As illustrated in FIG. 4, when the local IP stack on a node 102, 106 or 107 of FIG. 1 attempts to deliver a directed packet, it will first issue an ARP request to determine a MAC to IP address mapping. The ARP converts an IP address to a corresponding physical network address. FIG. 4 illustrates an example of a local network stack 126 handling broadcast requests internally. Typically, the ARP request is broadcast on the transmission medium for all other nodes to hear. As shown in FIG. 4 however, in the embodiment shown, the ARP request 128 is intercepted before it is transmitted, and answered using the address mapping present in the local ad-hoc routing table, or ARP table. The address mapping present in the local ad-hoc routing table is the result of the procedure described above, in which the unique IP address of the node is included in routing advertisements, each containing both the MAC address and a sufficient IP address to successfully perform a mapping. Therefore, a local ad-hoc routing table of a node will include a unique IP address for node 120 of, 169.254.98.34

Figure 5:
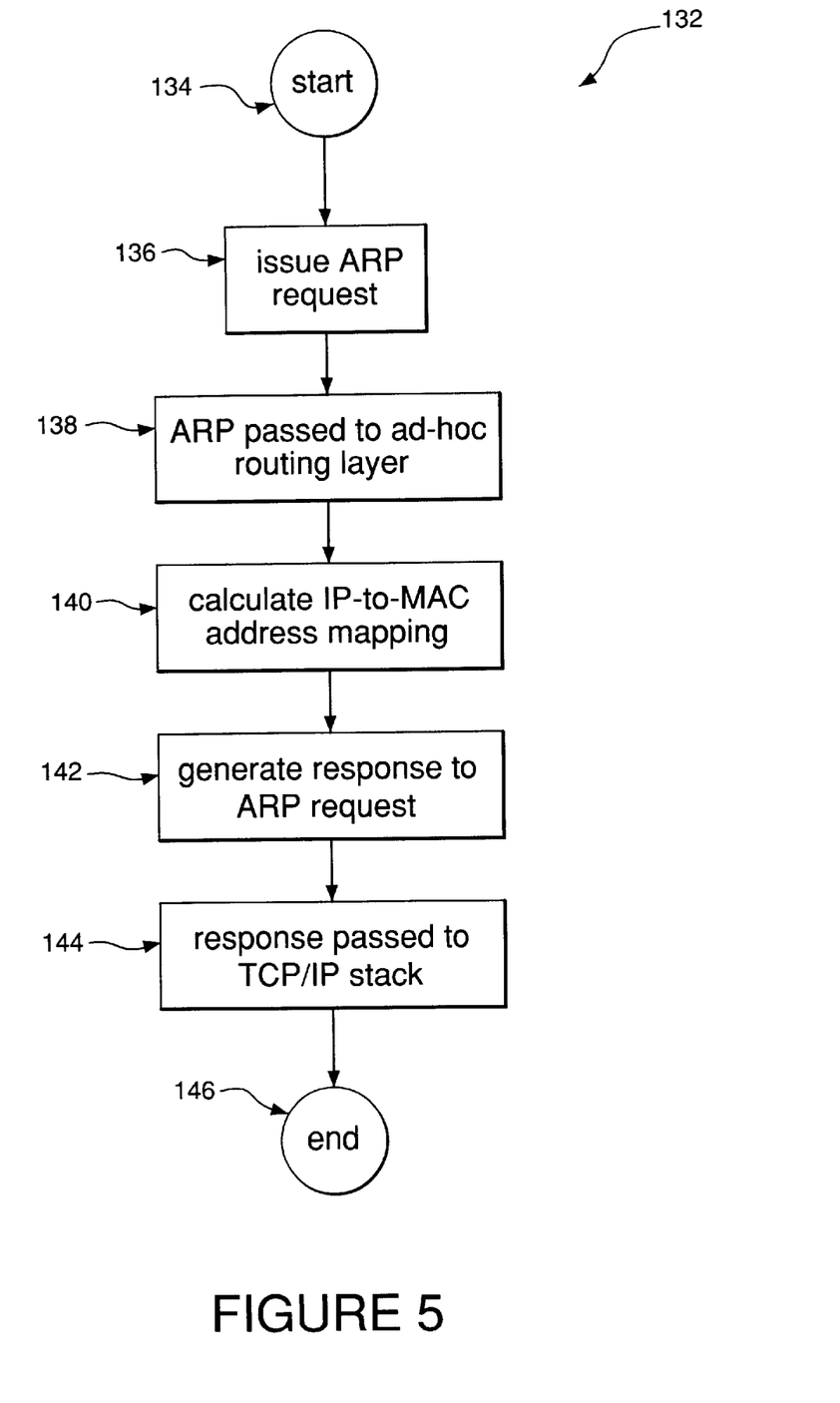
FIG. 5 illustrates a flow chart of an example of locally answering an ARP request in accordance with an embodiment of the present invention.

FIG. 5 illustrates a flow chart 132 of an example of locally answering an ARP request in accordance with an embodiment of the present invention. In FIG. 5, the process is begun when a locally generated ARP request is issued at a node 102, 106 or 107 in step 136. The ARP request is passed to the ad-hoc routing layer in step 138 and an IP-to-MAC address mapping is created in step 140. The mapping is established using the routing advertisements which contain both the MAC address and a sufficient IP address to successfully perform mapping between the two nodes. As noted above, the routing advertisements are maintained in the local ad-hoc routing table. The mapping response is generated in step 142 and passed back to the TCP/IP stack for transmission control in step 144. As shown, the ARP is responded to locally without the transmission of any network traffic with this value from the local ad-hoc routing table and the IP stack 126 can then transmit the directed IP packet with the correct MAC address.

As further illustrated in FIG. 4, DHCP query traffic is handled in a similar manner. DHCP allows a node to join an IP-based network without requiring a pre-configured IP address. A unique IP address is assigned to devices, and are released and renewed as nodes leave and re-join the network.

In FIG. 4, the DHCP request 130 for a local IP address is issued from the node's IP stack. This request is intercepted locally before transmission, and the local IP address mapping is inserted into the response. As with the ARP request, the address mapping present in the local ad-hoc routing table is the result of the procedure described above, in which the unique IP address of the node is included in routing advertisements, each containing both the MAC address and a sufficient IP address to successfully perform a mapping. Therefore, a local ad-hoc routing table of a node will include a unique IP address for node 120 of, 169.254.98.34

Figure 6:
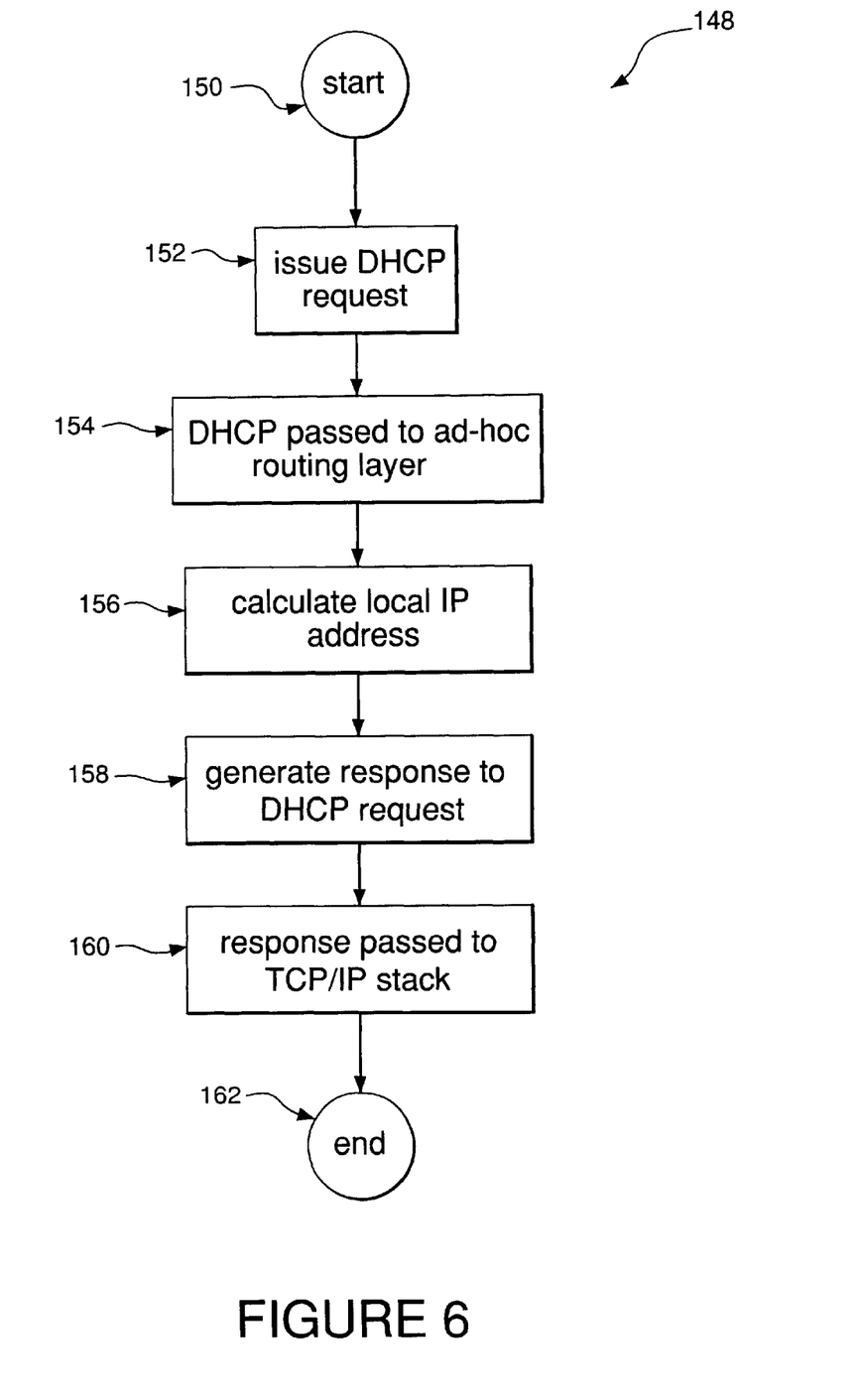
FIG. 6 illustrates a flow chart of an example of locally answering a DHCP request in accordance with an embodiment of the present invention.

FIG. 6 illustrates a flow chart 148 of an example of locally answering a DHCP request in accordance with an embodiment of the present invention. In FIG. 6, the process is begun when a locally generated DHCP request is issued at a node 102, 106 or 107 in step 152. The DHCP request is passed to the ad-hoc routing layer in step 154 and a local IP address is calculated in step 156. The IP address is determined from the routing advertisements which contain both the MAC address and a sufficient IP address to successfully perform mapping between the two nodes. As noted above, the routing advertisements are maintained in the local ad-hoc routing table. The IP address response is generated in step 158 and passed back to the TCP/IP stack for transmission control in step 160. As shown, the response to the DHCP request is passed back up to the IP stack without ever being transmitted.

According to one embodiment of the present invention, a gateway node is elected from the peer-to-peer ad-hoc network to provide access to network nodes on other subnets. In this embodiment, the gateway node is indicated by a separate bit in the RA, and noted in the local ad-hoc routing table. In FIG. 4, when the local IP stack issues DHCP requests for default gateway addresses, the IP address of a node is chosen from the entries in the routing table that has the gateway bit set. This address is reported as the default gateway in the DHCP response that is handled locally.

Figure 7:
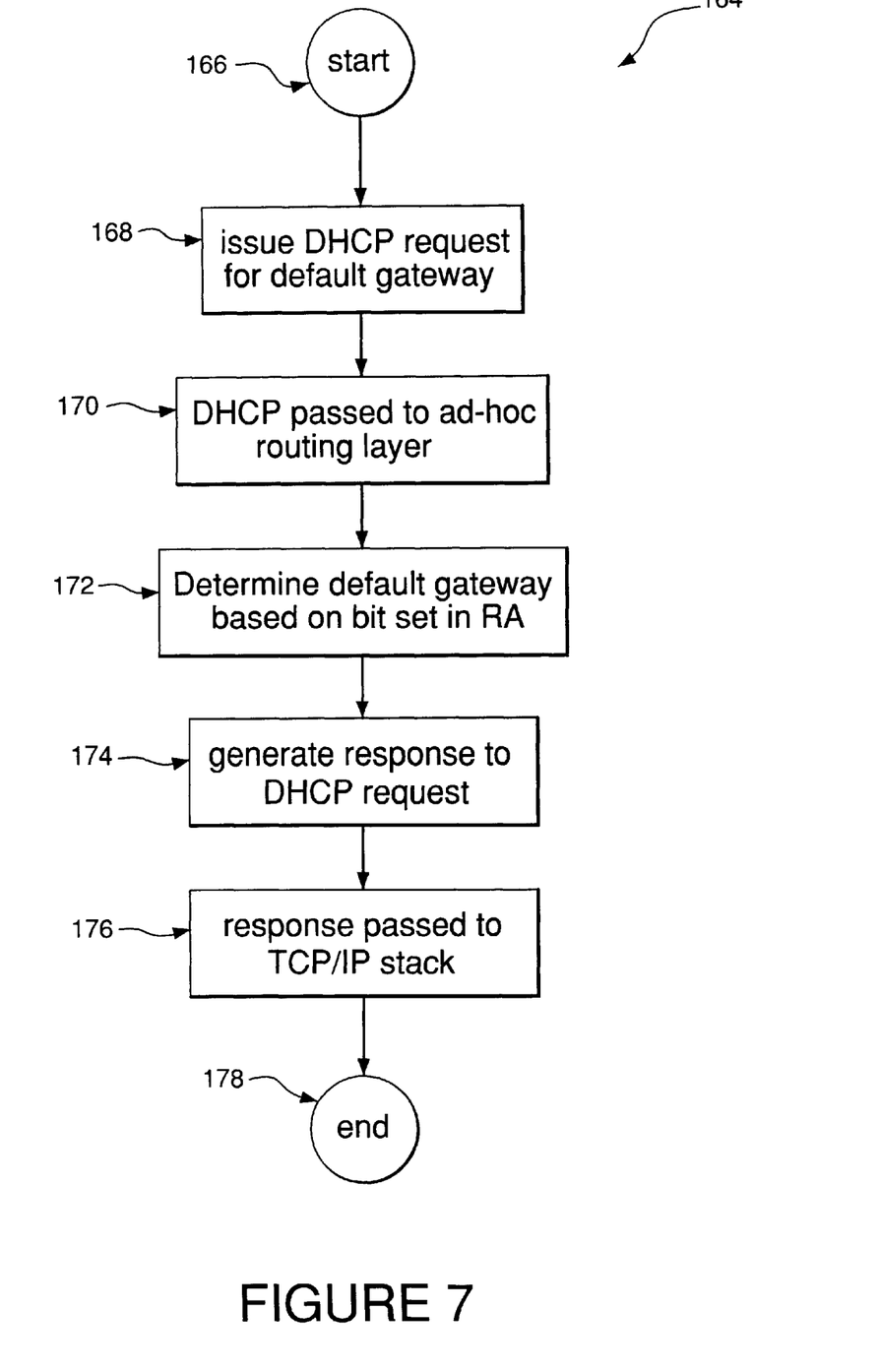
FIG. 7 illustrates a flow chart of an example of locally issuing a DHCP request for a default gateway in accordance with an embodiment of the present invention.

FIG. 7 illustrates a flow chart 164 of an example of locally issuing a DHCP request for a default gateway in accordance with an embodiment of the present invention. In FIG. 7, the process is begun when a locally generated DHCP request for a default gateway is issued at a node 102, 106 or 107 in step 168. The DHCP request is passed to the ad-hoc routing layer in step 170 and a default gateway is determined in step 172. The default gateway is determined from the routing advertisements which contain at least one bit which indicates if a node is a default gateway. As noted above, the routing advertisements are maintained in the local ad-hoc routing table. The response, including gateway node information, is generated in step 174 and passed back to the TCP/IP stack for transmission control in step 176.

Similarly, according to an embodiment of the present invention, other services located by DHCP are identified by using additional capability bits in the routing advertisements noted in the local ad-hoc routing table. In another embodiment, if only a single default gateway is present on the system, the DHCP response always reports the same IP address as a default gateway. In this case all traffic is intercepted before transmission at the ad-hoc routing layer that is addressed to the default gateway IP address, and is altered to contain the MAC address of the gateway that is determined to be optimal at the time of the transmission.

The embodiments of the present invention described above are advantageous in the distribution of the meaningful portion of the network address with the routing advertisements and storage in local ad-hoc routing tables. This feature of the embodiments allows the address mappings to passively propagate to each node in the ad-hoc routing network, eliminating the need for an active discovery process. Thus, a network according to an embodiment of the present invention requires no infrastructure to handle broadcast protocols for the purposes of network auto-configuration and address resolution in ad-hoc routing networks.

Of course, it will be appreciated that the present invention is applicable to other broadcast protocols. The invention can be applied to 802.11 devices in peer-to-peer mode as well as any other wireless device that allows direct peer-to-peer communication.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for controlling broad-cast messages within a network stack of a local node in an ad-hoc communications network, said network including a plurality of nodes being adapted to transmit and receive signals to and from other nodes in said network, the method comprising:

determining a Media Access Control (MAC) address for at least one node of a network identified by a subnet Internet Protocol (IP) address, and applying a hashing function to said MAC address to produce an abbreviated IP address;

constructing an IP address for said at least one node based on said abbreviated IP address and said subnet IP address, and communicating said IP address as a routing advertisement;

controlling a first node to receive said routing advertisement and maintain a local ad-hoc routing table based on said routing advertisement; and controlling said first node to intercept at least one of a locally issued Address Resolution Protocol (ARP) request and a Dynamic Host Configuration Protocol (DHCP) request and answer said intercepted request based on said local ad-hoc routing table.

2. A method as claimed in claim 1, further comprising:

applying said hashing function to said MAC address to produce said abbreviated IP address wherein said abbreviated IP address includes at least two bytes.

3. A method as claimed in claim 1, further comprising:

constructing said IP address for said at least one node by appending said abbreviated IP address with said subnet IP address for said at least one node.

4. A method as claimed in claim 1, further comprising:

controlling said first node to intercept a locally issued ARP request and to pass said request to an ad-hoc routing layer;

controlling said first node to calculate an IP to MAC address mapping in response to said ARP request based on said local ad-hoc routing table; and controlling said first node to pass said response to a TCP/IP stack.

5. A method as claimed in claim 4, wherein said response appears to said TCP/IP stack as an external node response to said ARP request.

6. A method as claimed in claim 1, further comprising:

controlling said first node to intercept a locally issued DHCP request and to pass said request to an ad-hoc routing layer;

controlling said first node to calculate a local IP address in response to said DHCP request based on said local ad-hoc routing table; and controlling said first node to pass said response to a TCP/IP stack.

7. A method as claimed in claim 6, wherein said response appears to said TCP/IP stack as an external node response to said DHCP request.

8. A method as claimed in claim 1, further comprising:

identifying said at least one node as a default gateway and in response, setting at least one bit in said routing advertisement.

9. A method as claimed in claim 8, further comprising:

controlling said first node to intercept at least one of a locally issued DHCP and ARP request for default gateway and to pass said request to an ad-hoc routing layer;

controlling said first node to determine said default gateway in response to said at least one DHCP and ARP request based on said local ad-hoc routing table; and controlling said first node to pass said response to a TCP/IP stack.

10. A method as claimed in claim 1, further comprising:

constructing said IP address for said at least one node wherein said first node can map at least one communication route between said first node and said at least one node based on said IP address.

11. A method as claimed in claim 1, further comprising:

constructing said IP address for said at least one node wherein said IP address identifies a subnet of said at least one node.

12. A method as claimed in claim 1, further comprising:

constructing said IP address for said at least one node wherein said IP address identifies a type and a location of said at least one node.

13. A system for controlling broad-cast messages within a network stack of a local node in an ad-hoc communications network, said network including a plurality of nodes being adapted to transmit and receive signals to and from other nodes in said network, the system comprising:

a first node, adapted to determine a Media Access Control (MAC) address for at least one node of a network identified by a subnet Internet Protocol (IP) address, and to apply a hashing function to said MAC address to produce an abbreviated IP address;

said first node being further adapted to construct an IP address for said at least one node based on said abbreviated IP address and said subnet IP address, and to communicate said IP address as a routing advertisement;

a second node, adapted to receive said routing advertisement and maintain a local ad-hoc routing table based on said routing advertisement; and said second node being further adapted to intercept at least one of a locally issued Address Resolution Protocol (ARP) request and a Dynamic Host Configuration Protocol (DHCP) request and to answer said intercepted request based on said local ad-hoc routing table.

14. A system as claimed in claim 13, wherein:

said first node is adapted to apply said hashing function to said MAC address to produce said abbreviated IP address wherein said abbreviated IP address includes at least two bytes.

15. A system as claimed in claim 13, wherein:

said first node is adapted to construct said IP address for said at least one node by appending said abbreviated IP address with said subnet IP address for said at least one node.

16. A system as claimed in claim 13, wherein:

said second node is adapted to intercept a locally issued ARP request and to pass said request to an ad-hoc routing layer; and said second node being further adapted calculate an IP to MAC address mapping in response to said ARP request based on said local ad-hoc routing table and to pass said response to a TCP/IP stack.

17. A system as claimed in claim 16 said response appears to said TCP/IP stack as an external node response to said ARP request.

18. A system as claimed in claim 13, wherein:

said second node is adapted to intercept a locally issued DCHP request and to pass said request to an ad-hoc routing layer; and said second node being further adapted to calculate a local IP address in response to said DHCP request based on said local ad-hoc routing table and to pass said response to a TCP/IP stack.

19. A system as claimed in claim 18 said response appears to said TCP/IP stack as an external node response to said DHCP request.

20. A system as claimed in claim 13, wherein:

said first node is adapted to identify said at least one node as a default gateway and in response, to set at least one bit in said routing advertisement.

21. A system as claimed in claim 20, wherein:

said second node is adapted to intercept at least one of a locally issued DHCP and ARP request for default gateway and to pass said request to an ad-hoc routing layer; and said second node being further adapted to determine said default gateway in response to said at least one of a DHCP and ARP request based on said local ad-hoc routing table and to pass said response to a TCP/IP stack.

22. A system as claimed in claim 13, wherein:

said first node is adapted to construct said IP address for said at least one node wherein said IP address identifies a subnet of said at least one node.

23. A system as claimed in claim 13, wherein:

said first node is adapted to construct said IP address for said at least one node wherein said IP address identifies a type and a location of said at least one node.

24. A computer-readable medium of instructions, adapted to control broadcast messages within a network stack of a local node in an ad-hoc communications network, said network including a plurality of nodes being adapted to transmit and receive signals to and from other nodes in said network, comprising:

a first set of instructions, adapted to determine a Media Access Control (MAC) address for at least one node of a network identified by a subnet Internet Protocol (IP) address, and to apply a hashing function to said MAC address to produce an abbreviated IP address;

a second set of instructions, adapted to construct an IP address for said at least one node based on said abbreviated IP address and said subnet IP address, and to communicate said IP address as a routing advertisement;

a third set of instructions, adapted to control a first node to receive said routing advertisement and maintain a local ad-hoc routing table based on said routing advertisement; and a fourth set of instructions, adapted to control said first node to intercept at least one of a locally issued Address Resolution Protocol (ARP) request and a Dynamic Host Configuration Protocol (DHCP) request and to answer said intercepted request based on said local ad-hoc routing table.

25. A computer-readable medium of instructions as claimed in claim 24, further comprising:

a fifth set of instructions, adapted to map at least one communication route between said first node and said at least one node based on said IP address for said at least one node.

26. A computer-readable medium of instructions as claimed in claim 24, wherein:

said first set of instructions is adapted to apply said hashing function to said MAC address to produce said abbreviated IP address wherein said abbreviated IP address includes at least two bytes.

27. A computer-readable medium of instructions as claimed in claim 24, wherein:

said second set of instructions is adapted to construct said IP address for said at least one node by appending said abbreviated IP address with said subnet IP address for said at least one node.

28. A computer-readable medium of instructions as claimed in claim 24, wherein:

said fourth set of instructions is adapted to control said first node to intercept a locally issued ARP request and to pass said request to an ad-hoc routing layer; and said fourth set of instructions being further adapted to control said first node to calculate an IP to MAC address mapping in response to said ARP request based on said local ad-hoc routing table and to pass said response to a TCP/IP stack.

29. A computer-readable medium of instructions as claimed in claim 24, wherein:

said fourth set of instructions is adapted to control said first node to intercept a locally issued DHCP request and to pass said request to an ad-hoc routing layer;

said fourth set of instructions being further adapted to control said first node to calculate a local IP address in response to said DHCP request based on said local ad-hoc routing table and to pass said response to a TCP/IP stack.

30. A computer-readable medium of instructions as claimed in claim 24, wherein:

said second set of instructions is adapted to identify said at least one node as a default gateway and in response, setting at least one bit in said routing advertisement.

31. A computer-readable medium of instructions as claimed in claim 30, wherein:

said fourth set of instructions is adapted to control said first node to intercept at least one of a locally issued DHCP and ARP request for default gateway and to pass said request to an ad-hoc routing layer; and said fourth set of instructions being further adapted to control said first node to determine said default gateway in response to said at least one of a DHCP and ARP request based on said local ad-hoc routing table and to pass said response to a TCP/IP stack.

* * * * *